United States Patent
Tanaka et al.

(10) Patent No.: US 10,550,804 B2
(45) Date of Patent: Feb. 4, 2020

(54) AIR INTAKE APPARATUS OF MULTI-CYLINDER ENGINE HAVING SECONDARY GAS INLET PASSAGE CONNECTED TO INTAKE AIR INLET PASSAGE

(71) Applicant: Mazda Motor Corporation, Aki-gun, Hiroshima (JP)

(72) Inventors: Fusatoshi Tanaka, Higashihiroshima (JP); Kazuki Onishi, Hiroshima (JP); Takuya Yamada, Hiroshima (JP); Ryo Yamamoto, Hiroshima (JP); Kazuhiro Nakamura, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 16/178,876

(22) Filed: Nov. 2, 2018

(65) Prior Publication Data
US 2019/0136805 A1 May 9, 2019

(30) Foreign Application Priority Data
Nov. 7, 2017 (JP) .................................. 2017-214407

(51) Int. Cl.
*F02M 35/10* (2006.01)
*F02M 26/19* (2016.01)
(Continued)

(52) U.S. Cl.
CPC ...... *F02M 35/10222* (2013.01); *F02M 25/06* (2013.01); *F02M 26/19* (2016.02);
(Continued)

(58) Field of Classification Search
CPC .. F02M 35/10; F02M 35/10222; F02M 26/19; F02M 26/41; F02M 25/06;
(Continued)

(56) References Cited

U.S. PATENT DOCUMENTS 4,117,808 A * 10/1978 Takamiya ............... F02B 31/08
123/430
2015/0020781 A1 1/2015 Keating et al.

FOREIGN PATENT DOCUMENTS

| JP | 01115814 U | 8/1989 |
| JP | 04237826 A | 8/1992 |

(Continued)

OTHER PUBLICATIONS

European Patent Office, Extended European Search Report Issued in Application No. 18203063.5, dated Feb. 15, 2019, Germany, 7 pages.

(Continued)

*Primary Examiner* — Hieu T Vo
(74) *Attorney, Agent, or Firm* — Alleman Hall Creasman & Tuttle LLP (57) ABSTRACT

An air intake apparatus of a multi-cylinder engine includes an intake air inlet passage, an intake air distribution portion, a plurality of independent intake air passages, and a secondary gas inlet passage. The intake air inlet passage has one end portion attached to a throttle valve, and the other end connected to an intake air distribution portion. The intake air distribution portion has a space therein. The secondary gas inlet passage is connected at a part spaced apart, in the intake air inlet passage, from the throttle valve. The intake air distribution portion has a reflux passage which is a passage that connects the space and a part between the one end portion and the other end in the intake air inlet passage. The reflux passage is a passage which refluxes fresh air and secondary gas introduced from the intake air inlet passage to the intake air inlet passage.

6 Claims, 9 Drawing Sheets

(51) Int. Cl.
*F02M 26/41* (2016.01)
*F02M 35/104* (2006.01)
*F02M 25/06* (2016.01)
*F02M 35/108* (2006.01)
*F02M 35/112* (2006.01)

(52) U.S. Cl.
CPC .......... *F02M 26/41* (2016.02); *F02M 35/104* (2013.01); *F02M 35/108* (2013.01); *F02M 35/10026* (2013.01); *F02M 35/10039* (2013.01); *F02M 35/10045* (2013.01); *F02M 35/10085* (2013.01); *F02M 35/10255* (2013.01); *F02M 35/112* (2013.01)

(58) Field of Classification Search
CPC ....... F02M 35/10039; F02M 35/10026; F02M 35/10045; F02M 35/10085; F02M 35/10255; F02M 35/104; F02M 35/108; F02M 35/112
See application file for complete search history.

(56) References Cited

FOREIGN PATENT DOCUMENTS

| | | |
|---|---|---|
| JP | 2003201926 A | 7/2003 |
| JP | 2006022709 A | 1/2006 |
| JP | 2009144573 A | 7/2009 |
| JP | 2009203920 A | 9/2009 |
| JP | 2010096131 A | 4/2010 |
| JP | 2015034526 A | 2/2015 |
| JP | 2015048794 A | 3/2015 |
| JP | 2016070249 A | 5/2016 |
| JP | 2016121632 A | 7/2016 |
| JP | 2018105219 A | 7/2018 |

OTHER PUBLICATIONS

Japanese Patent Office, Office Action Issued in Application No. 2017214407, dated Dec. 11, 2018, 8 pages.

* cited by examiner

FIG. 9 ically downstream side of the throttle valve on the throttle valve passage enables an EGR gas to be taken into the throttle valve passage smoothly making use of a negative pressure generated immediately downstream side of a valve body in the throttle valve.

AIR INTAKE APPARATUS OF MULTI-CYLINDER ENGINE HAVING SECONDARY GAS INLET PASSAGE CONNECTED TO INTAKE AIR INLET PASSAGE

TECHNICAL FIELD

The present invention relates to an air intake apparatus of a multi-cylinder engine.

BACKGROUND ART

In a vehicle such as an automobile, an intake manifold is attached to an engine. Japanese Patent Application Laid-Open No. 2016-70249 discloses an intake manifold including a runner connected to a cylinder head of an engine, a surge tank connected to an intake upstream side of the runner, and a throttle valve passage connected to an intake upstream side of the surge tank for taking in fresh air. Then, in the intake manifold disclosed in Japanese Patent Application Laid-Open No. 2016-70249, a throttle valve is attached to an intake upstream end of the throttle valve passage.

Some of conventional intake manifolds adopt a configuration in which an EGR (Exhaust Gas Recirculation) passage for introducing an EGR gas is connected to a throttle valve passage. According to conventional art, an EGR passage is connected to a part immediately downstream side of a throttle valve on a throttle valve passage.

As described above, connecting the EGR passage to a part immediately downstream side of the throttle valve on the throttle valve passage enables an EGR gas to be taken into the throttle valve passage smoothly making use of a negative pressure generated immediately downstream side of a valve body in the throttle valve.

SUMMARY OF INVENTION

In an intake manifold configured to have an EGR passage immediately downstream side of the throttle valve as described above, however, moisture contained in an EGR gas might be attached to the throttle valve to have water condensation. In such a case where condensed water is thus attached to the throttle valve as described above, when outside air temperature is low (0° C. or below), there is a concern that the throttle valve might freeze to cause malfunction.

For suppressing malfunction of the throttle valve due to condensed water as described above, a connection part of an EGR passage to a throttle valve passage can be placed apart from the throttle valve. In this case, however, a distance from the connection part to a surge tank becomes short to involve a concern that mixing performance of fresh air and an EGR gas might be de deteriorated.

Such problems as described above occur not only in a case where an EGR gas is taken into a throttle valve passage but also in a case of taking in a purge gas, a blow-by gas, or the like.

The present invention is intended to solve the above problems and aims at providing an air intake apparatus of a multi-cylinder engine which enables suppression of malfunction of a throttle valve even when an outside air temperature is low, as well as ensuring high mixing performance of fresh air and a secondary gas.

An air intake apparatus of a multi-cylinder engine according to one aspect of the present invention includes an intake air inlet passage with one end portion attached to a throttle valve; an intake air distribution portion which is a container connected to the other end of the intake air inlet passage and having a space therein for intake air distribution to each cylinder; a plurality of independent intake air passages each having one end connected to the intake air distribution portion and the other end connected to each intake port of the multi-cylinder engine; and a secondary gas inlet passage which is a passage connected at a part spaced apart, in the intake air inlet passage, from the throttle valve by a predetermined interval for introducing a secondary gas to the intake air inlet passage, in which the intake air distribution portion has a reflux passage which is a passage that connects the space and a part between the one end portion and the other end in the intake air inlet passage, the passage refluxing fresh air and the secondary gas introduced from the intake air inlet passage to the intake air inlet passage.

DESCRIPTION OF EMBODIMENTS

In the following, an embodiment of the present invention will be described with reference to the drawings. The mode to be described below shows one example of the present invention and does not limit the present invention except for a fundamental configuration thereof.

In the drawings for use in the following description, "Up" indicates above a vehicle, "Lo" indicates below the vehicle, "Fr" indicates the front of the vehicle, "Re" indicates the rear of the vehicle, "Le" indicates the left of the vehicle, and "Ri" indicates the right of the vehicle.

Embodiment

1. Engine 3 and Intake Manifold 7 in Vehicle 1

Description will be made of an arrangement mode of an engine 3 and an intake manifold (air intake apparatus) 7 in a vehicle 1 according to the present embodiment with reference to FIG. 1.

Figure 1:
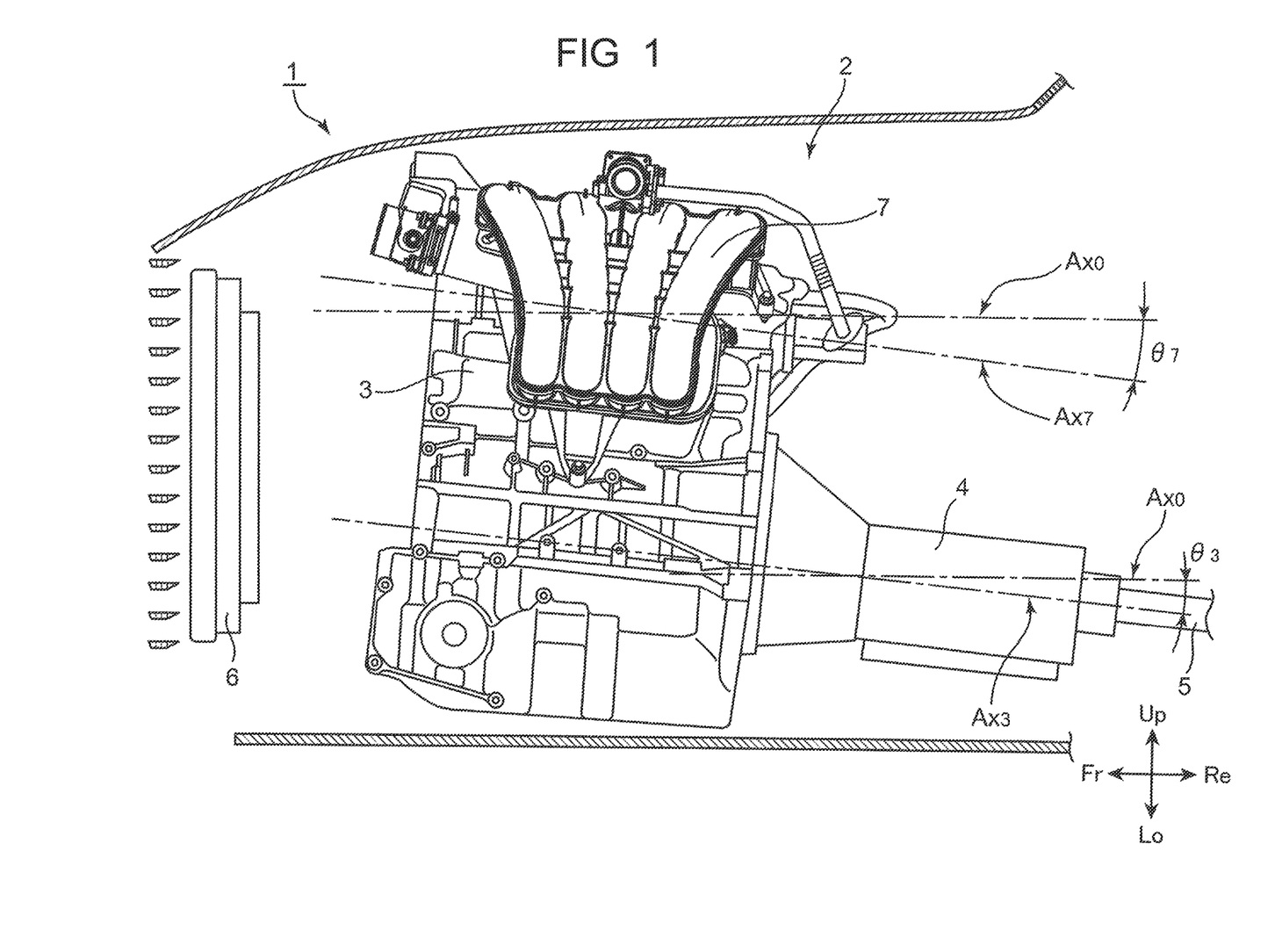
FIG. 1 is a schematic side view showing an engine and an intake manifold mounted in an engine room of a vehicle according to an embodiment.

As shown in FIG. 1, the engine 3 is mounted in an engine room 2 provided in a front part of the vehicle 1. In the vehicle 1 according to the present embodiment, a four-cylinder gasoline engine is applied as one example of the engine 3. The engine 3 is mounted such that a direction of a cylinder bank thereof faces to a front-rear (Fr-Re) direction of the vehicle 1. In other words, the vehicle 1 according to the present embodiment is vertically mounted with the engine 3.

To the engine 3, a transmission 4 is attached on the rear Re side of the engine 3, and a propeller shaft 5 extends from the transmission 4 toward the rear Re of the vehicle 1. A radiator 6 is provided on the front Fr side of the engine 3 in the vehicle 1.

The intake manifold (air intake apparatus) 7 is attached to the engine 3. The intake manifold 7 is arranged on the left Le side of the vehicle 1 (the near side on the plane of the sheet shown in FIG. 1).

Here, the engine 3 has an axis (output axis) $Ax_3$ thereof in the front-rear (Fr-Re) direction of the vehicle 1 slanting at an angle $\theta_3$ to a horizontal axis $Ax_0$. Additionally, as the engine 3 slants, the intake manifold 7 also has an axis $Ax_7$ thereof in the front-rear (Fr-Re) direction of the vehicle 1 slanting at an angle $\theta_7$ to the horizontal axis $Ax_0$.

In the present embodiment, the angle $\theta_3$ and the angle $\theta_7$ are the same angle.

2. Outside Configuration of Intake Manifold 7

Figure 2:
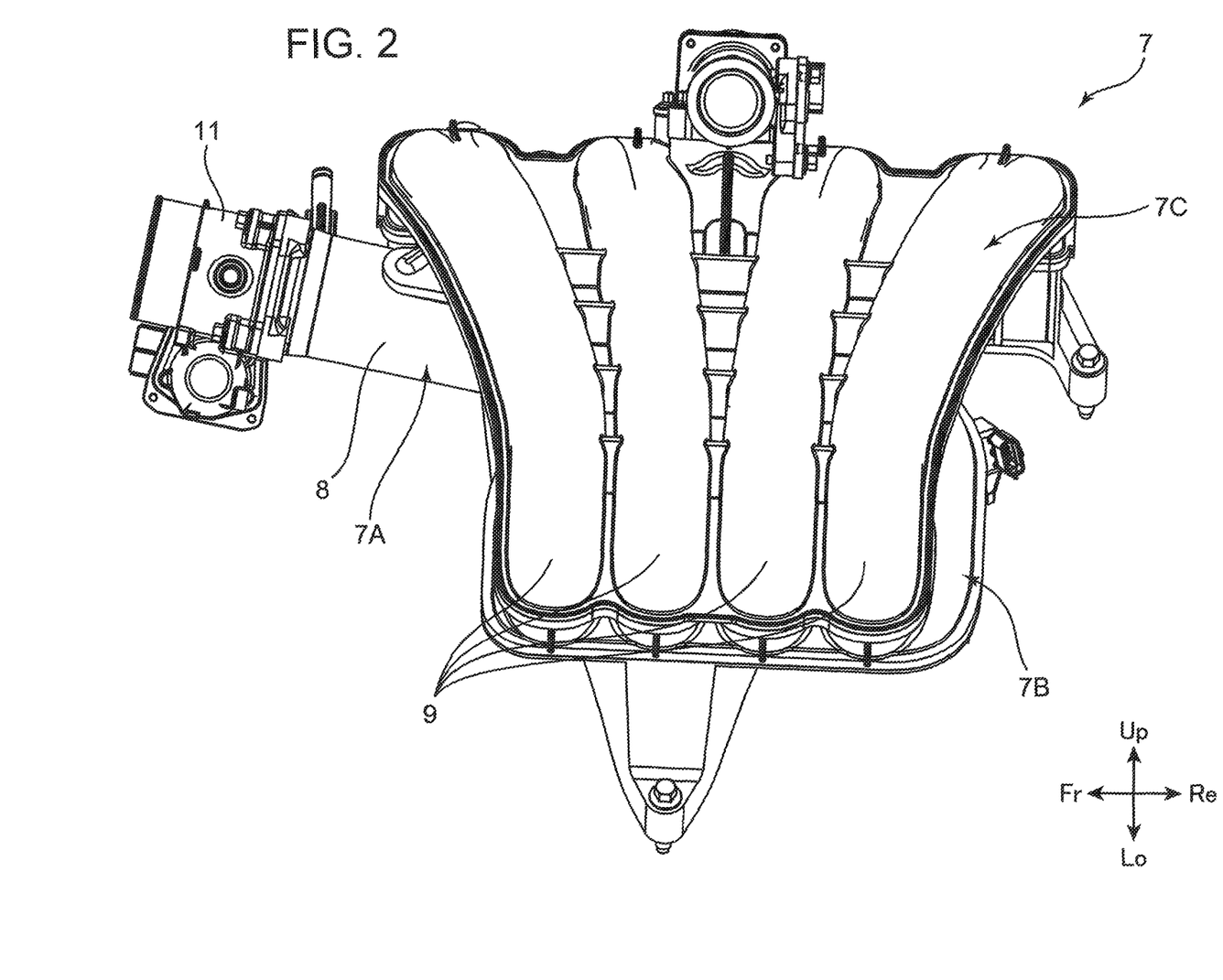
FIG. 2 is a schematic front view showing a configuration of an intake manifold.

Description will be made of an outside configuration of the intake manifold 7 with reference to FIG. 2 to FIG. 4. FIG. 2 is a schematic front view of the intake manifold 7 seen from the left Le side of the vehicle 1, FIG. 3 is a schematic rear view of the intake manifold 7 seen from the side of the engine 3, and FIG. 4 is a schematic side view of the intake manifold 7 seen from the front Fr side of the vehicle 1.

Figure 4:
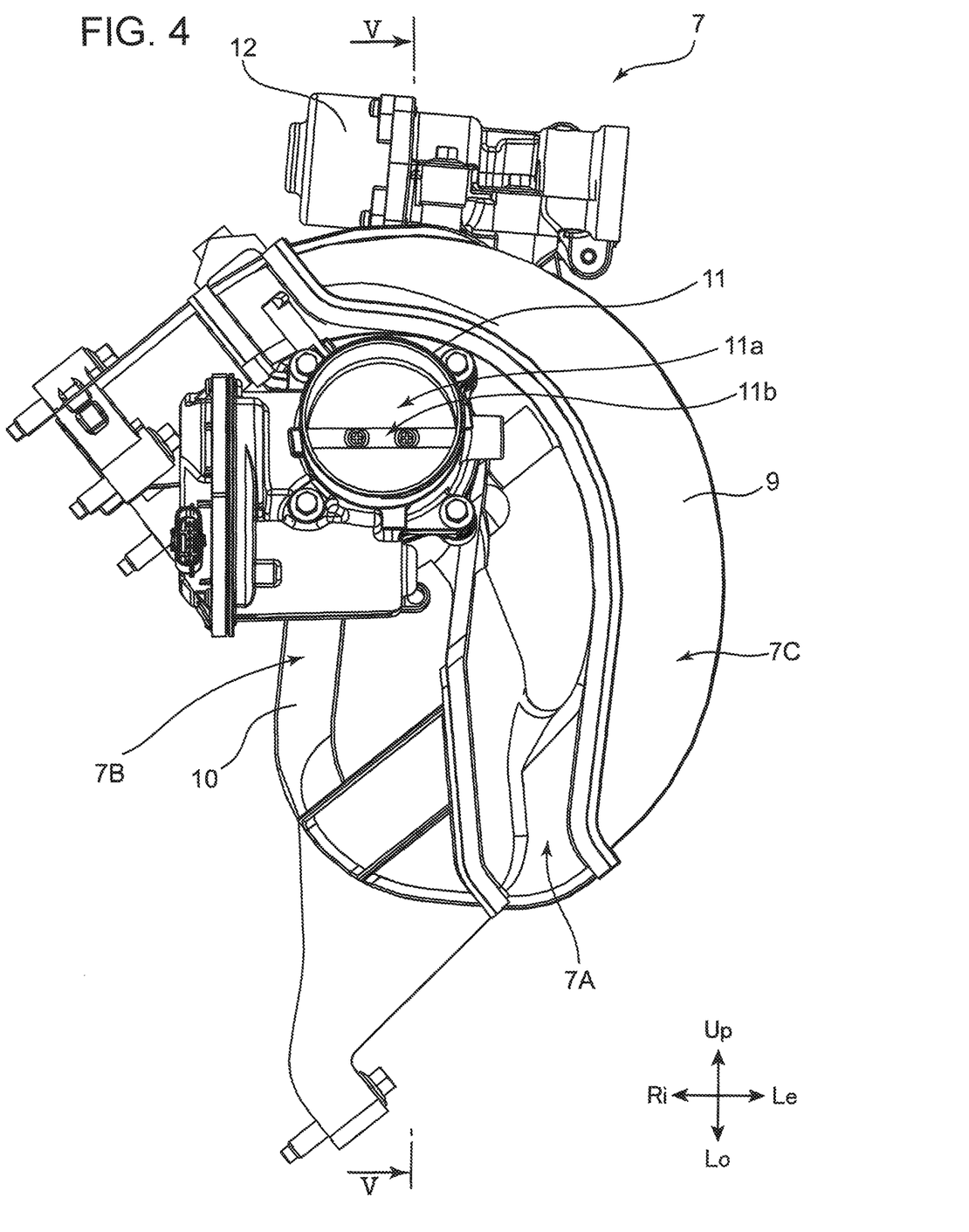
FIG. 4 is a schematic side view showing a configuration of the intake manifold.

As shown in FIG. 2 and FIG. 4, the intake manifold 7 according to the present embodiment has three constituent members 7A to 7C. Each of the three constituent members 7A to 7C is formed from, for example, a resin material. The number and a shape of the constituent members forming the intake manifold 7 are not limited thereto.

Figure 3:
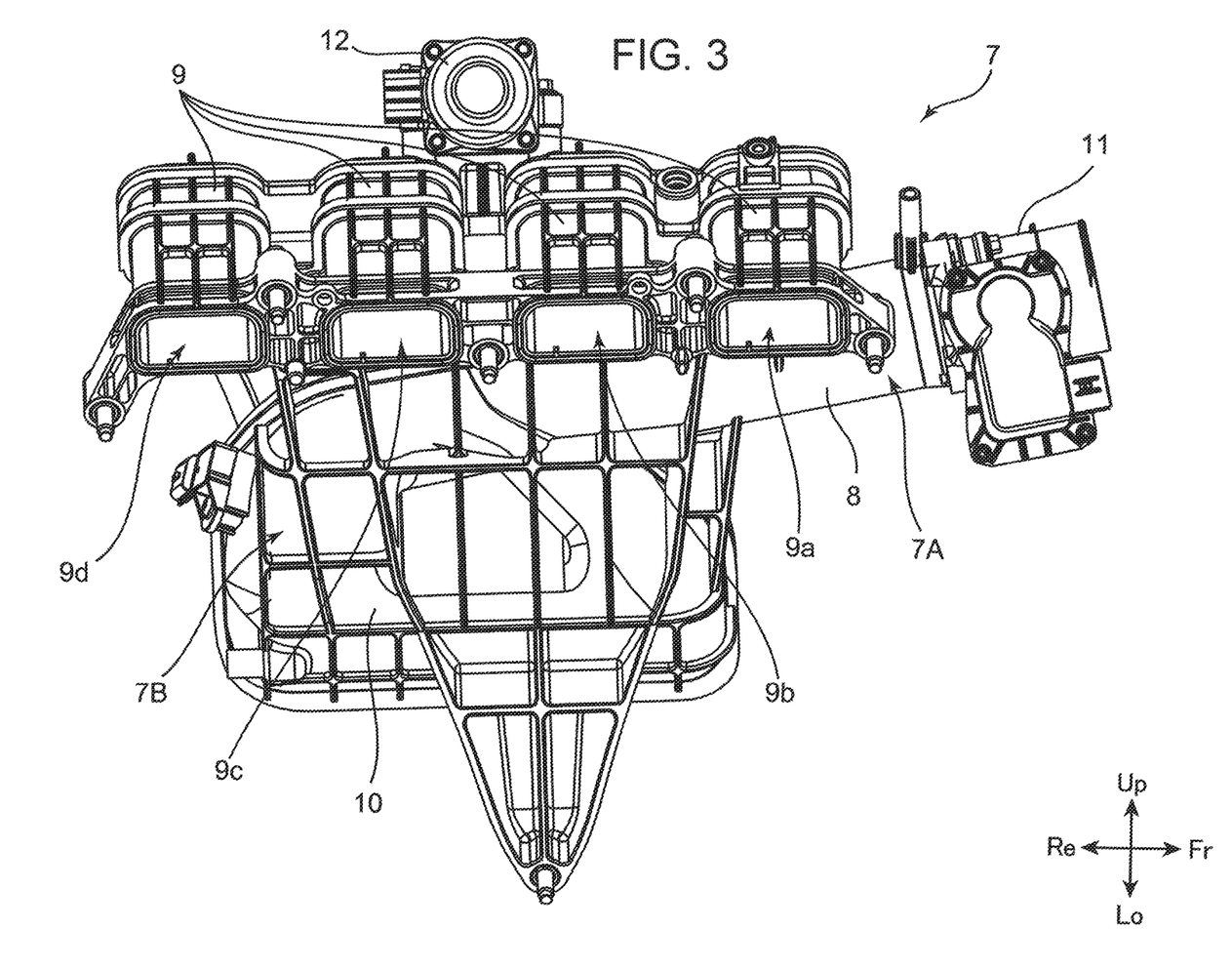
FIG. 3 is a schematic rear view showing a configuration of the intake manifold.

As shown in FIG. 2 to FIG. 4, the intake manifold 7 has a throttle valve passage (an intake air inlet passage) 8, a plurality of (four in the present embodiment) runners (independent intake air passages) 9, a surge tank (an intake air distribution portion) 10, a throttle valve 11, and an EGR valve 12. In the following description, the throttle valve is recited as "T/V" and the throttle valve passage as "T/V passage" in some cases.

As shown in FIG. 2 and FIG. 3, the T/V 11 is attached to an end portion, on the front Fr side of the vehicle 1, of the T/V passage 8. As shown in FIG. 4, the T/V 11 is a butterfly valve which has a valve body 11a freely rotatable around a rotating shaft 11b and adjusts an amount of inflow of intake air into the engine 3.

As shown in FIG. 3, an end portion, on the rear Re side of the vehicle 1, of the T/V passage 8, is connected to the surge tank 10. A connection part of the T/V passage 8 in the surge tank 10 is a part rear most on the rear Re side in the front-rear direction (Fr-Re) of the vehicle 1.

The surge tank 10 slants such that a bottom surface portion thereof goes low Lo from the front Fr side to the rear Re side following the slanting arrangement of the intake manifold 7 as described above.

Returning to FIG. 2, each of the four runners 9 is a passage for sending intake air distributed by the surge tank 10 to each intake port of the engine 3. The four runners 9 according to the present embodiment are integrally formed. This enables improvement of rigidity.

As shown in FIG. 4, the four runners 9 are configured to arc so as to surround the left Le and the Up sides of the surge tank 10 in a side view seen from the front Fr side (a direction vertical to the plane of the sheet) of the vehicle 1. As shown in FIG. 3, the four runners 9 are provided with exit side opening portions 9a to 9d, respectively, to be connected to the respective intake ports of the engine 3.

Although in the present embodiment, the exit side opening portions 9a to 9d are provided one each corresponding to each cylinder of the engine 3, two or more, not limited to one, exit side opening portions can be provided corresponding to each cylinder.

As shown in FIG. 3 and FIG. 4, the EGR valve 12 is disposed in a part on the Up side of the intake manifold 7. An EGR passage leading to the T/V passage 8 is connected to the EGR valve 12. This will be detailed later.

3. Internal Configuration of Intake Manifold 7

Figure 5:
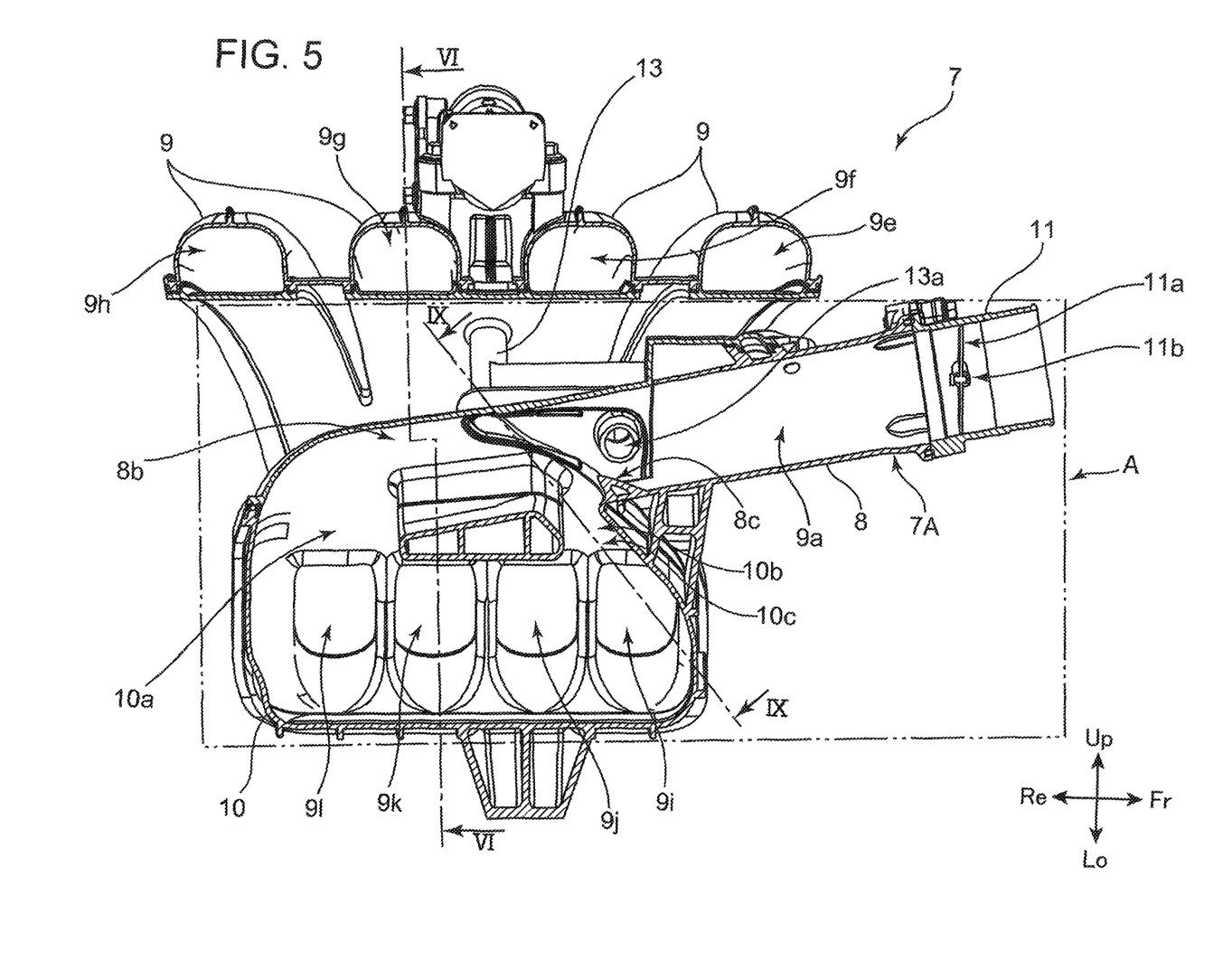
FIG. 5 is a schematic sectional view showing an internal configuration of the intake manifold, which is a view of a cross section taken along V-V in FIG. 4.
Figure 6:
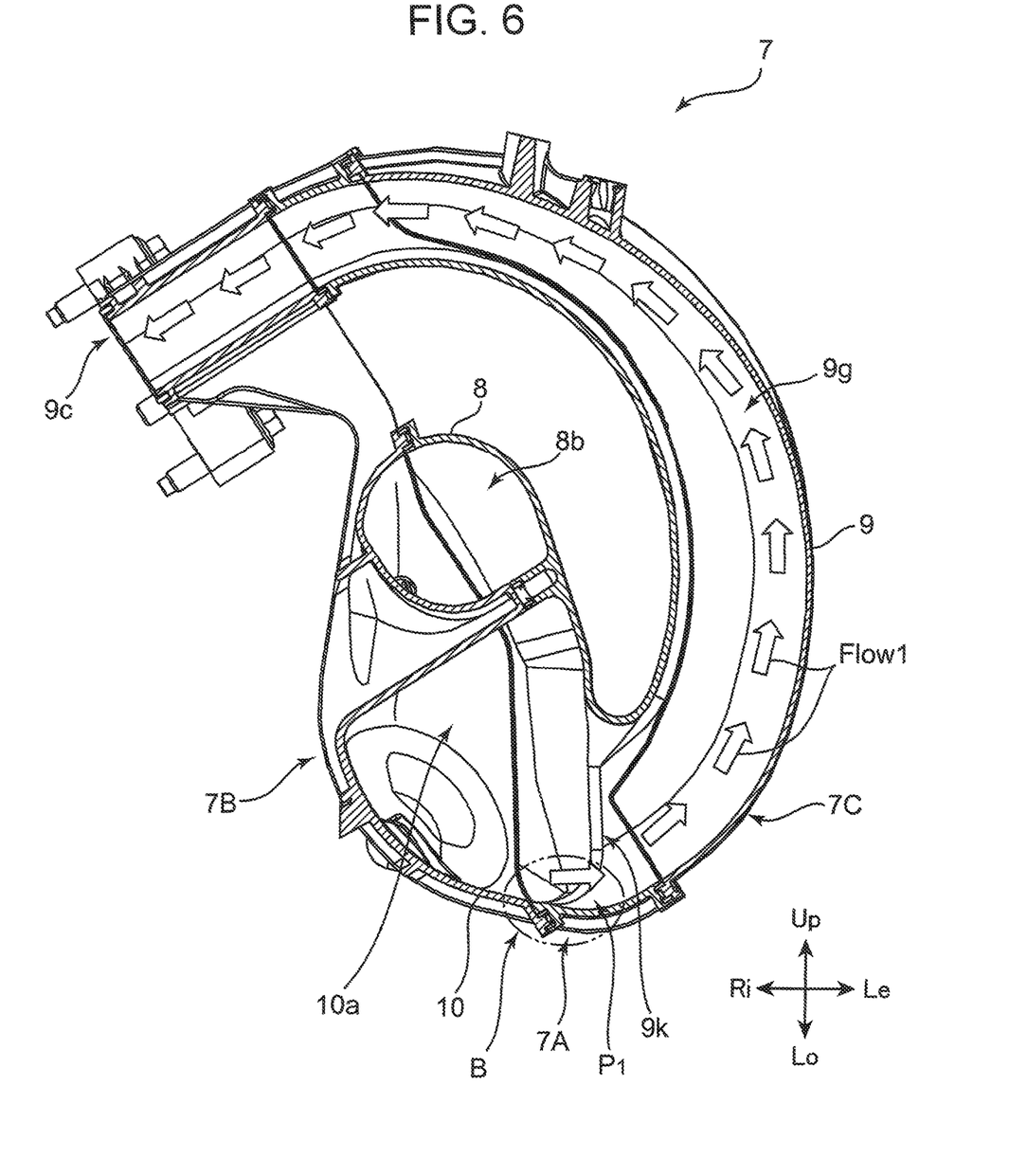
FIG. 6 is a schematic sectional view showing the internal configuration of the intake manifold, which is a view of a cross section taken along VI-VI in FIG. 5.

An internal configuration of the intake manifold 7 will be described with reference to FIG. 5 and FIG. 6. FIG. 5 is a schematic sectional view showing a cross section taken along V-V in FIG. 4, and FIG. 6 is a schematic sectional view showing a cross section taken along VI-VI in FIG. 5.

As shown in FIG. 5, in the T/V passage 8, an upstream side passage portion 8a and a downstream side passage portion 8b are formed to be continuous with each other as an intake air path between the T/V 11 and the surge tank 10. In the T/V passage 8, an exit side opening portion 13a of an EGR passage (secondary gas inlet passage) 13 leading to the EGR valve 12 (see FIG. 3 and FIG. 4) is opened.

The exit side opening portion 13a of the EGR passage 13 is provided in a generally central part of the T/V passage 8 in a longitudinal direction (a flow direction of intake air). Then, in the present embodiment, in a passage portion of the T/V passage 8, an intake upstream side of the exit side opening portion 13a of the EGR passage 13 will be referred to as the upstream side passage portion 8a and an intake air downstream side will be referred to as the downstream side passage portion 8b.

Also in the T/V passage 8, a rectification portion 8c is provided in a part corresponding to a low Lo part of the exit side opening portion 13a of the EGR passage 13. The rectification portion 8c is configured with a slanting surface which rises toward the Up side from the front Fr side to the rear Re side. Function performed by the rectification portion 8c will be described later.

As described above, the T/V passage 8 is connected, to the surge tank 10, at an end portion farthest (a part separate most) from an end portion in which the T/V 11 is attached. Specifically, the T/V passage 8 is connected at the most rear Re side of the surge tank 10.

The surge tank 10 is internally provided with a surge tank inner space 10a. The surge tank inner space 10a communicates with the downstream side passage portion 8b of the T/V passage 8. The surge tank 10 also has entrance side opening portions 9i to 9l opened which lead to passage portions 9e to 9h of the runner 9. This makes the surge tank inner space 10a communicate also with the passage portions 9e to 9h of the runner 9.

As shown in FIG. 6, a bottom portion $P_1$ of the surge tank 10 is configured to have a smooth curved surface. Then, a low Lo side part of the entrance side opening portions 9i to 9l of the runner 9 (in FIG. 6, only the entrance side opening portion 9k is shown for the convenience of illustration) is provided to be generally flush with the bottom portion $P_1$ (see a part indicated by an arrow B). The passage portions 8a and 8b of the T/V passage 8 are configured to be directed to the bottom portion $P_1$ of the surge tank 10.

Here, as described with reference to FIG. 1, in the intake manifold 7 according to the present embodiment, the angle $Ax_7$ in the front-rear (Fr-Re) direction of the vehicle 1 slants at the angle $\theta_7$ relative to the horizontal axis $Ax_0$. Therefore, the bottom portion $P_1$ of the surge tank 10 also slants at the angle $\theta_7$ in the front-rear (Fr-Re) direction of the vehicle 1, i.e., along the direction of the cylinder bank of the engine 3.

Therefore, as shown in FIG. 5, the entrance side opening portions 9i to 9l are sequentially arranged on the low Lo side of the vehicle 1 in the order of the entrance side opening portion 9i, the entrance side opening portion 9j, the entrance side opening portion 9k, and the entrance side opening portion 9l.

In the surge tank 10, a reflux passage portion 10b is formed which communicates a most front Fr side part of the surge tank inner space 10a with the downstream side passage portion 8b in the T/V passage 8. The reflux passage portion 10b has a low Lo side located above a part in which the entrance side opening portions 9j and 9i are opened in the surge tank 10 and has an Up side located immediately downstream of a part in which the rectification portion 8c is provided in the T/V passage 8.

In FIG. 5, a connection part between the surge tank inner space 10a and the reflux passage portion 10b is indicated by a reference code 10c.

4. Air Flow in Intake Manifold 7

Figure 7:
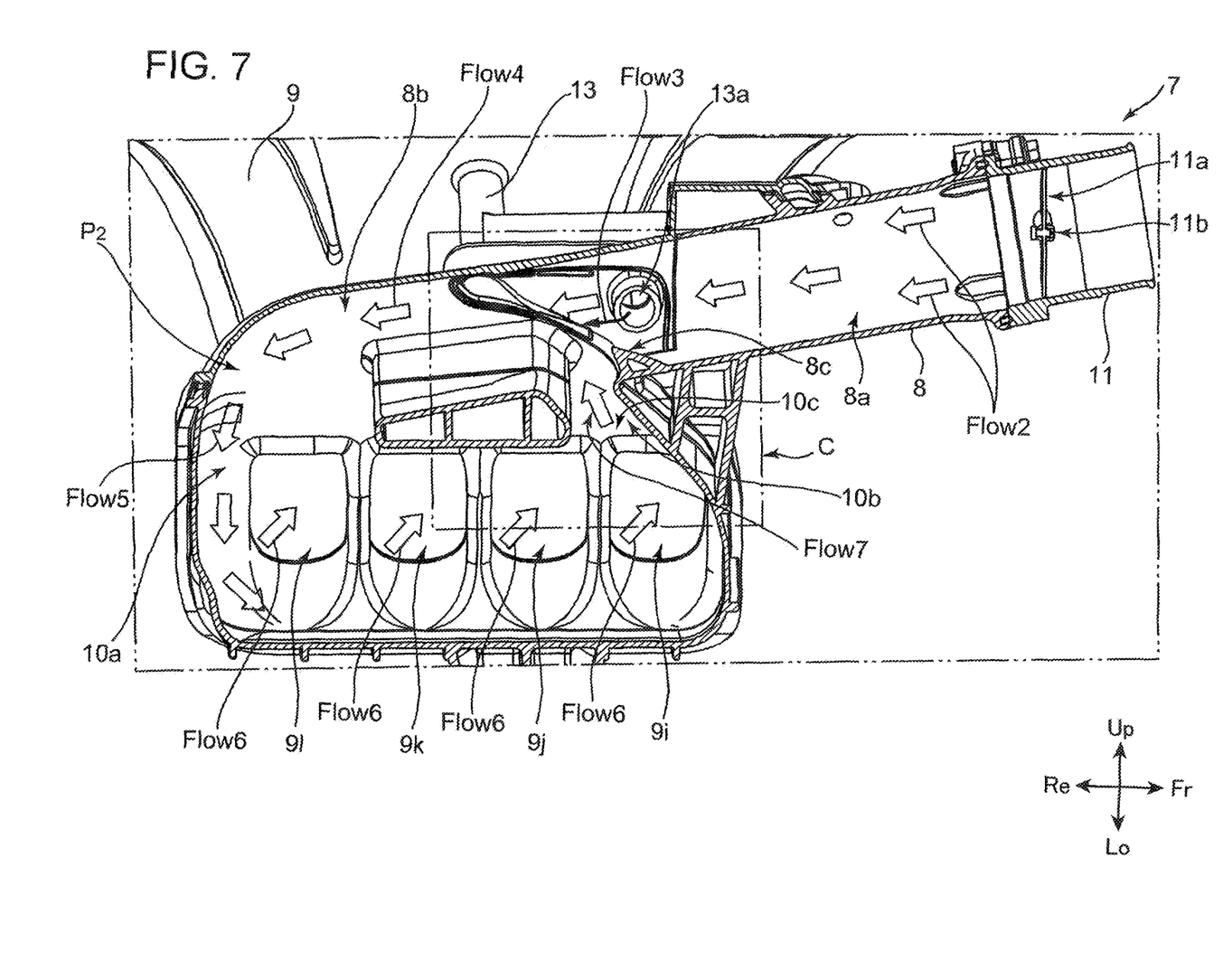
FIG. 7 is a schematic sectional view showing a part of the internal configuration of the intake manifold, which is an enlarged view of a part A in FIG. 5.

An air flow in the intake manifold 7 will be described with reference to FIG. 6 and FIG. 7. FIG. 7 is a schematic sectional view showing an enlarged view of a part A in FIG. 5.

As shown in FIG. 7, fresh air (air) introduced according to opening of the valve body 11a in the T/V 11 flows toward the downstream side (the rear Re side) through the upstream side passage portion 8a of the T/V passage 8 (an air flow Flow 2).

A predetermined amount of an EGR gas (a secondary gas) jets from the exit side opening portion 13a of the EGR passage 13 to the downstream side passage portion 8b of the T/V passage 8 according to valve opening of the EGR valve 12. The EGR gas flows toward the downstream side (the rear Re side) through the downstream side passage portion 8b of the T/V passage 8 (an EGR gas flow Flow 3).

The fresh air introduced via the T/V 11 and the EGR gas jetted from the exit side opening portion 13a of the EGR passage 13 are mixed when advancing in the downstream side passage portion 8b of the T/V passage 8 (an air flow Flow 4). Then, the mixed gas (the fresh air+the EGR gas) are introduced into the surge tank inner space 10a of the surge tank 10 (an air flow Flow 5).

The air flow Flow 5 flows along an inner wall surface of the surge tank 10, and the gas is temporarily stored in the surge tank inner space 10a of the surge tank 10. This leads to uniform distribution of the gas to the entrance side opening portions 9i to 9l of the respective runners 9, and leads also to prevention of intake interference.

The gas is introduced into the respective runners 9 from the surge tank 10 via the entrance side opening portions 9i to 9l (an air flow Flow 6). Also from the surge tank 10, a part of the gas (the fresh air, the EGR gas) is refluxed from the connection part 10c to the downstream side passage portion 8b of the T/V passage 8 through the reflux passage portion 10b (an air flow Flow 7). The refluxed gas (the fresh air, the EGR gas) is again mixed in the downstream side passage portion 8b and sent to the surge tank inner space 10a of the surge tank 10.

As shown in FIG. 6, the gas (the mixed gas of the fresh air and the EGR gas) sent from the surge tank inner space 10a of the surge tank 10 to the runners 9 via the entrance side opening portions 9i to 9l (in FIG. 6, only the entrance side opening portion 9k is shown for the convenience of illustration) is sent from the passage portions 9e to 9h of the runners 9 to the intake ports of the engine 3 via the exit side opening portions 9a to 9d (an air flow Flow 1).

In FIG. 6, for the convenience of illustration, only the passage portion 9g of the passage portions 9e to 9h is illustrated, and only the exit side opening portion 9c of the exit side opening portions 9a to 9d is illustrated.

5. Function Performed by Rectification Portion 8c

Figure 8:
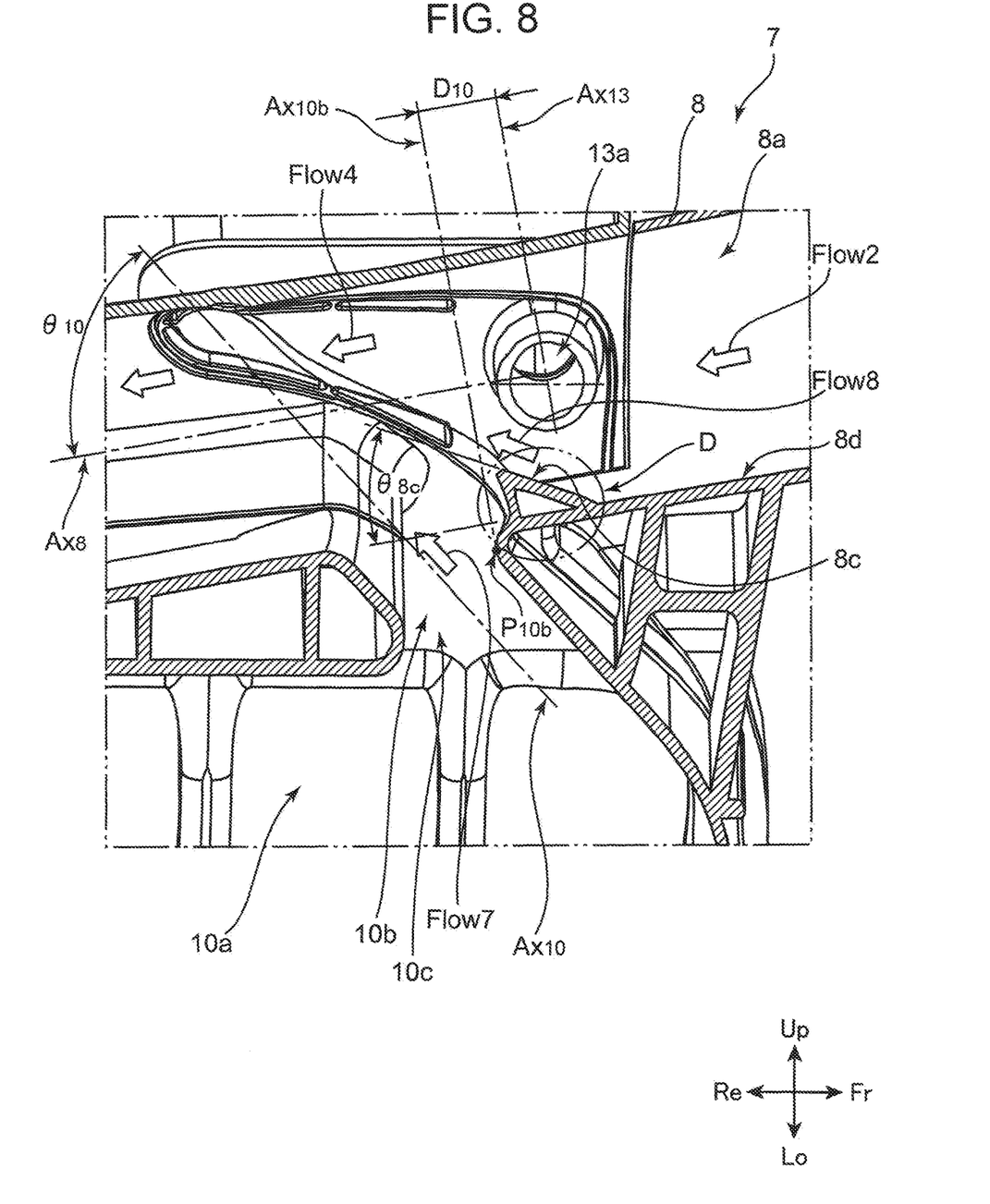
FIG. 8 is a schematic sectional view showing a connection part of a reflux passage portion to a throttle valve passage in the intake manifold, which is an enlarged view of a part C in FIG. 7.

Description will be made of a function performed by the rectification portion 8c provided on an inner wall surface the T/V passage 8 with reference to FIG. 8. FIG. 8 is a schematic sectional view showing an enlarged view of a part C in FIG. 7.

As shown in FIG. 8, the rectification portion 8c in the T/V passage 8 has a cross section triangular in shape and is formed to rise upward from the intake upstream side (the front Fr side) toward the intake air downstream side (the rear Re side)(see a part indicated by an arrow D).

The rectification portion 8c deflects, to the Up side, fresh air flowing along a bottom surface 8d which is an inner wall surface on the bottom side (the low Lo side) of an inner wall surface surrounding the upstream side passage portion 8a in the T/V passage 8 (an air flow Flow 8). The air flow Flow 8 becomes a flow avoiding an opening portion of the reflux passage portion 10b.

Thus, the intake manifold 7 according to the present embodiment enables an increase in effects of having a negative pressure at an exit part of the reflux passage portion 10b by providing the rectification portion 8c of the T/V passage 8. Accordingly, the intake manifold 7 accelerates reflux to the T/V passage 8 via the reflux passage portion 10b, thereby improving mixing performance.

In the present embodiment, an angle $\theta_{8c}$ of the rectification portion 8c (a slanting surface) to the bottom surface 8d is set to be within a range of 10° to 45°, more preferably, 20° to 35°.

6. Configuration of Reflux Passage Portion 10b

Figure 9:
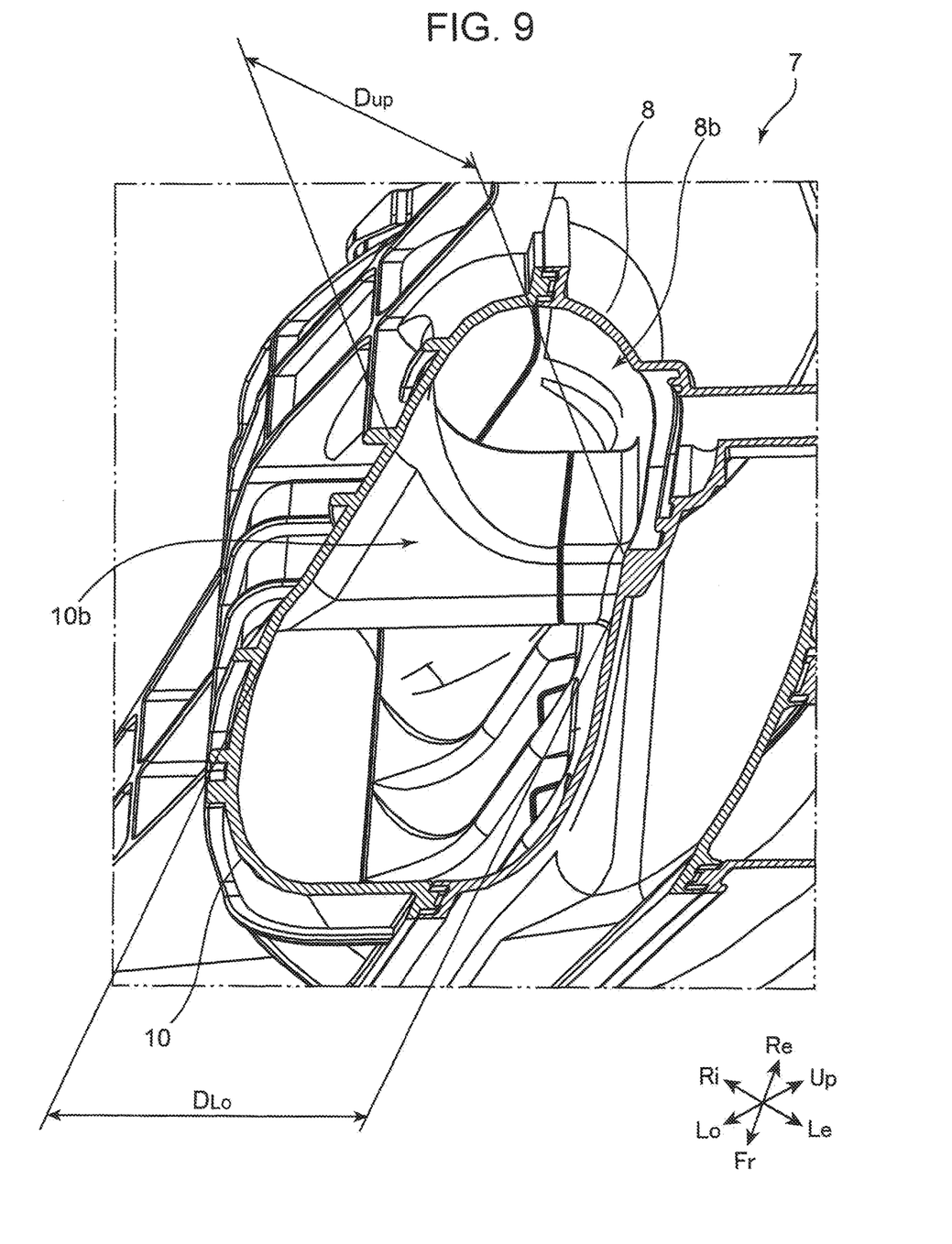
FIG. 9 is a schematic sectional view showing a shape of the reflux passage portion, which is a view of a cross section taken along IX-IX in FIG. 5.

A configuration of the reflux passage portion 10b will be described with reference to FIG. 8 and FIG. 9. FIG. 9 is a schematic sectional view showing a cross section taken along IX-IX in FIG. 5.

As shown in FIG. 8, the reflux passage portion 10b provided to communicate the surge tank inner space 10a of the surge tank 10 with the downstream side passage portion 8b of the T/V passage 8 is configured to face obliquely rearward as a tube axis $Ax_{10}$ goes upward. An angle $\theta_{10}$ formed by the tube axis $Ax_{10}$ of the reflux passage portion 10b and a tube axis $Ax_8$ of the downstream side passage portion 8b of the T/V passage 8 is set to be less than 90°. In other words, the tube axis $Ax_{10}$ of the reflux passage portion 10b and the tube axis $Ax_8$ of the T/V passage 8 are set to cross with each other at an acute angle.

Additionally, as shown in FIG. 8, the reflux passage portion 10b is connected to the T/V passage 8 at a downstream side (the rear Re side), in the flow direction of intake air, of the exit side opening portion 13a of the EGR passage 13. Specifically, when a virtual line $Ax_{13}$ is drawn in a direction orthogonal to the tube axis $Ax_8$ from the center of the exit side opening portion 13a of the EGR passage 13, and a virtual line $Ax_{10b}$ parallel to the virtual line $Ax_{13}$ is drawn from an upper front end portion $P_{10b}$ of the reflux passage portion 10b, an interval between the virtual line $Ax_{13}$ and the virtual line $Ax_{10b}$ is represented as $D_{10}$. The interval $D_{10}$ is set to be approximately, for example, 10 mm to 50 mm.

Further, as shown in FIG. 8, the reflux passage portion 10b is configured such that a connection part (an upper portion) with the T/V passage 8 faces the downstream side (the rear Re side) of a direction along the flow of intake air. Therefore, this configuration, together with the formation of the rectification portion 8c, suppresses backflow of fresh air, an EGR gas, or the like having flown through the upstream side passage portion 8a of the T/V passage 8 toward the surge tank 10 through the reflux passage portion 10b.

As shown in FIG. 9, the reflux passage portion 10b is provided to have a shape in which a width of an inner cross section of the passage is gradually decreased from the side of the surge tank inner space 10a of the surge tank 10 (the low Lo side) toward the side of the downstream side passage portion 8b of the T/V passage 8 (the Up side). Specifically, the reflux passage portion 10b has a width of an inner cross section on the side of the surge tank inner space 10a is represented as $D_{LO}$, and a width of an inner cross section on the side of the downstream side passage portion 8b of the T/V passage 8 is represented as $D_{UP}$. The sectional width $D_{LO}$ and the sectional width $D_{UP}$ satisfy the following relationship.

$$D_{LO} > D_{UP} \qquad \text{[Mathematical 1]}$$

The sectional width $D_{LO}$ is the same as a width of the surge tank inner space 10a of the surge tank 10 shown in FIG. 9. On the other hand, the sectional width $D_{UP}$ is the same or less than an inner diameter of the downstream side passage portion 8b of the T/V passage 8.

7. Effects

In the intake manifold (air intake apparatus) 7 of the engine 3 according to the present embodiment, the exit side opening portion (connection part) 13a of the EGR passage (secondary gas inlet passage) 13 is spaced apart in the T/V passage (intake air inlet passage) 8 from the T/V 11 by a predetermined interval. Therefore, in the intake manifold 7 according to the present embodiment, moisture (condensed water) contained in an EGR gas (secondary gas) is hardly attached to the T/V 11 as compared with a case where the exit side opening portion of the EGR passage is provided immediately after the T/V 11. Accordingly, the intake manifold 7 according to the present embodiment can suppress malfunction of the T/V 11 due to moisture in an EGR gas even when an outside air temperature is low (0° C. or below).

Also in the intake manifold 7 of the engine 3 according to the present embodiment, because the surge tank 10 is designed to have the reflux passage portion 10b, fresh air and an EGR gas (secondary gas) having passed through the T/V passage 8 and introduced into the surge tank inner space 10a of the surge tank 10 are refluxed to the downstream side passage portion 8b of the T/V passage 8 (the air flow Flow 7). As a result, even when the exit side opening portion 13a of the EGR passage 13 is provided spaced apart from the T/V 11 by a predetermined interval, the intake manifold 7 can maintain high mixing performance between fresh air and an EGR gas.

During driving of the engine 3, the T/V passage 8 has a relatively negative pressure with respect to the surge tank inner space 10a of the surge tank 10. Therefore, the fresh air and the EGR gas in the surge tank inner space 10a are refluxed to the T/V passage 8 with a pressure difference between the downstream side passage portion 8b of the T/V passage 8 and the surge tank inner space 10a.

Here, while in the present embodiment, the exit side opening portion 13a of the EGR passage 13 is provided in a generally central part of the T/V passage 8 in a longitudinal direction, the position of the exit side opening portion 13a is not limited thereto. In other words, the same effect as the above can be obtained by setting a spaced distance from the T/V 11 to the exit side opening portion 13a to be a distance spaced to the outside of a range where the T/V passage 8 has a negative pressure irrespective of a degree of opening of the valve body 11a of the T/V 11. However, it goes without saying that providing the exit side opening portion 13a of the EGR passage 13 at a position as far from the T/V 11 as possible more suppresses attachment of condensed water to the T/V 11 than in a conventional case.

Additionally, since in the intake manifold 7 of the engine 3 according to the present embodiment, the connection part of the reflux passage portion 10b to the T/V passage 8 is located downstream of the part in which the exit side opening portion 13a of the EGR passage 13 is provided (the downstream side in the flow direction of intake air), it is possible to suppress backflow of only fresh air from the T/V passage 8 to the surge tank inner space 10a via the reflux passage portion 10b due to intake air pulsation.

Also, since in the intake manifold 7 of the engine 3 according to the present embodiment, the rectification portion 8c is provided more to the T/V 11 side (the upstream side in the flow direction of intake air) than to the connection part of the reflux passage portion 10b in the T/V passage 8, the downstream side part of the rectification portion 8c (the part to which the reflux passage portion 10b is connected) is allowed to have a negative pressure. Accordingly, in the intake manifold 7 of the engine 3 according to the present embodiment, gas reflux from the reflux passage portion 10b to the downstream side passage portion 8b of the T/V passage 8 can be produced more effectively.

Additionally, since in the intake manifold 7 of the engine 3 according to the present embodiment, the reflux passage portion 10b is connected to the T/V passage 8 in such a manner as described with reference to FIG. 8 that the tube axis $Ax_{10}$ of the reflux passage portion 10b faces to the downstream side of the T/V passage 8 (the downstream side in the flow direction of intake air), and is connected at the acute angle (angle $\theta_{10}$) to the tube axis $Ax_8$ of the T/V passage 8, refluxed fresh air and EGR gas can be smoothly combined with fresh air and an EGR gas having flown from the upstream side passage portion 8a of the T/V passage 8.

The intake manifold 7 of the engine 3 according to the present embodiment also enables more reliable suppression of backflow of fresh air having flown from the upstream side passage portion 8a of the T/V passage 8 to the surge tank inner space 10a through the reflux passage portion 10b.

Also, since in the intake manifold 7 of the engine 3 according to the present embodiment, the connection part between the surge tank 10 and the T/V passage 8 is arranged most apart from the T/V 11 in an extension direction (longitudinal direction) of the T/V passage 8 (arranged at the left end of FIG. 5, which is a part on the rear Re side of the vehicle 1), a maximum flow path length from a position at which the exit side opening portion 13a of the EGR passage 13 is provided in the T/V passage 8 to the surge tank 10 can be ensured. Accordingly, in the intake manifold 7 of the engine 3 according to the present embodiment, further higher mixing performance of fresh air and a secondary gas can be ensured.

Additionally, in the intake manifold 7 of the engine 3 according to the present embodiment, the connection part of the T/V passage 8 in the surge tank 10 is arranged on the rear Re side in the front-rear (Fr-Re) direction of the vehicle 1, and the connection part 10c between the surge tank inner space 10a and the reflux passage portion 10b is arranged on the front Fr side, the connection parts being arranged opposite to each other in the front-rear (Fr-Re) direction of the vehicle 1. Accordingly, in the intake manifold 7 of the engine 3 according to the present embodiment, the downstream side passage portion 8b of the T/V passage 8, the surge tank inner space 10a, and the reflux passage portion 10b form a long circular flow path to ensure further higher mixing performance between fresh air and a secondary gas.

As described in the foregoing, the intake manifold 7 of the engine 3 according to the present embodiment can suppress malfunction of the T/V 11 even when an outside air temperature is low (in a case of 0° C. or below), as well as ensuring high mixing performance between fresh air and a secondary gas.

[Modification]

While in the above embodiment, a four-cylinder gasoline engine is adopted as the engine 3, the present invention is not limited thereto. For example, a gasoline engine with three or less cylinders or five or more cylinders, or the like can be used. It is also possible to adopt a diesel engine not a gasoline engine.

Although the above embodiment adopts an FR car in which the engine 3 is vertically mounted to drive a rear tire as an example, the present invention is not limited thereto. For example, an FF car can be adopted in which an engine is transversely arranged with respect to an engine room.

While the above embodiment adopts a straight extending pipe body as the T/V passage 8, the present invention is not limited thereto. For example, a pipe body curved to have a U-shape can be adopted as a T/V passage.

As described with reference to FIG. 5, although it is assumed in the above embodiment that the surge tank inner space 10a has a generally rectangular shape when the surge tank 10 is viewed from the right Ri side of the vehicle 1, the present invention is not limited thereto. It is also possible to adopt, for example, a surge tank having a surge tank inner space with a round shape, an oval shape, or a shape obtained by cutting a part of the same.

While in the above embodiment, an EGR gas as one example of a secondary gas is refluxed to the T/V passage 8, the present invention is not limited thereto. It is also possible to configure the apparatus such that a secondary gas such as a purge gas or a blow-by gas is refluxed to the T/V passage.

While the above embodiment is configured not to have a control valve or the like provided in the reflux passage portion 10b for controlling a flow rate, the present invention is not limited thereto. For example, a control valve may be provided which controls a flow rate of a gas to be refluxed from the surge tank to the T/V passage according to an engine speed, an amount of intake air, a concentration of $O_2$, or the like.

While in the above embodiment, the intake manifold 7 is configured with a combination of three constituent members 7A to 7C, the present invention is not limited thereto. For example, the intake manifold can be configured with a combination of two constituent members or a combination of four or more constituent members.

While in the above embodiment, the four runners 9 are integrally formed, the present invention is not limited thereto. The respective runners may be separately provided or two each can be integrally formed.

While in the above embodiment, the rectification portion 8c is configured with a plane slanting surface, the present invention is not limited thereto. For example, the rectification portion can be configured with a curved convex or concave surface.

CONCLUSION

An air intake apparatus of a multi-cylinder engine according to one aspect of the present invention includes an intake air inlet passage with one end portion attached to a throttle valve; an intake air distribution portion which is a container connected to the other end of the intake air inlet passage and having a space therein for intake air distribution to each cylinder; a plurality of independent intake air passages each having one end connected to the intake air distribution portion and the other end connected to each intake port of the multi-cylinder engine; and a secondary gas inlet passage which is a passage connected at a part spaced apart, in the intake air inlet passage, from the throttle valve by a predetermined interval for introducing a secondary gas to the intake air inlet passage, in which the intake air distribution portion has a reflux passage which is a passage that connects the space and a part between the one end portion and the other end in the intake air inlet passage, the passage refluxing fresh air and the secondary gas introduced from the intake air inlet passage to the intake air inlet passage.

In the air intake apparatus of a multi-cylinder engine according to the above aspect, a connection part of the secondary gas inlet passage to the intake air inlet passage is spaced apart from the throttle valve by a predetermined interval. Therefore, as compared with a case where a secondary gas inlet passage is connected immediately after a part where a throttle valve in an intake air inlet passage is attached, moisture (condensed water) contained in a secondary gas is hardly attached to the throttle valve. Accordingly, the intake apparatus of a multi-cylinder engine according to the above aspect can suppress malfunction of the throttle valve even when an outside air temperature is low (0° C. or below).

Additionally, since in the air intake apparatus of a multi-cylinder engine according to the above aspect, the intake air distribution portion is designed to have the reflux passage, at least a part of the fresh air and the secondary gas introduced into the space of the intake air distribution portion from the intake air inlet passage is refluxed to the intake air inlet passage. As a result, the air intake apparatus of a multi-cylinder engine according to the above aspect can maintain high mixing performance between fresh air and a secondary gas even when the secondary gas inlet passage is connected spaced apart from the throttle valve by a predetermined interval.

During driving of a multi-cylinder engine, the intake air inlet passage has a relatively negative pressure with respect to the space in the intake air distribution portion. Therefore, the fresh air and the secondary gas in the intake air distribution portion are refluxed to the intake air inlet passage with a pressure difference between the intake air inlet passage and the space in the intake air distribution portion.

Accordingly, the air intake apparatus of a multi-cylinder engine according to the above aspect can suppress malfunction of the throttle valve even when an outside air temperature is low, as well as ensuring high mixing performance between fresh air and a secondary gas.

Here, the above-described "a part spaced apart by a predetermined interval" represents a part spaced to the outside of a range where the intake air inlet passage has a negative pressure irrespective of a degree of opening of the throttle valve. However, it goes without saying that connecting the secondary gas inlet passage at a part as far from the throttle valve as possible more suppresses attachment of condensed water to the throttle valve than in a conventional case.

Also in the air intake apparatus of a multi-cylinder engine according to the above aspect, the connection part of the reflux passage to the intake air inlet passage can be located downstream, in the flow direction of intake air, of the connection part of the secondary gas inlet passage to the intake air inlet passage.

Since in the air intake apparatus of a multi-cylinder engine adopting the above configuration, the connection part of the reflux passage to the intake air inlet passage is located downstream of the connection part of the secondary gas inlet passage (the downstream side in the flow direction of intake air), it is possible to suppress backflow of only fresh air from the intake air inlet passage via the reflux passage to the intake air distribution portion due to intake air pulsation.

In the air intake apparatus of a multi-cylinder engine according to the above aspect, the intake air inlet passage may also have a rectification portion provided more to the throttle valve side than to the connection part of the reflux passage such that the fresh air and the secondary gas flowing along an inner wall surface of the intake air inlet passage are spaced apart from the connection part of the reflux passage.

Since in the air intake apparatus of a multi-cylinder engine adopting the above configuration, the rectification portion is provided more to the throttle valve side (the upstream side in the flow direction of intake air) than to the connection part of the reflux passage in the intake air inlet passage, the downstream side part of the rectification portion is allowed to have a negative pressure. Accordingly, in the air intake apparatus of a multi-cylinder engine according to the above aspect, reflux from the reflux passage to the intake air inlet passage can be produced more effectively.

Also in the air intake apparatus of a multi-cylinder engine according to the above aspect, the reflux passage can be connected to the intake air inlet passage such that a tube axis of the reflux passage faces to the downstream side in the flow direction of intake air and is at an acute angle to a tube axis of the intake air inlet passage.

Since in the air intake apparatus of a multi-cylinder engine adopting the above configuration, the reflux passage is connected to the intake air inlet passage such that the tube axis of the reflux passage faces to the downstream side of the intake air inlet passage (the downstream side in the flow direction of intake air) and is connected at an acute angle, refluxed fresh air and secondary gas can be smoothly joined with fresh air and a secondary gas having flown from the upstream side of the intake air inlet passage (upstream of the connection part of the reflux passage).

The air intake apparatus of a multi-cylinder engine adopting the above configuration also enables more reliable suppression of backflow of fresh air and a secondary gas having flown from the upstream side of the intake air inlet passage (upstream of the connection part of the reflux passage) to the reflux passage.

In the air intake apparatus of a multi-cylinder engine according to the above aspect, an extension direction of the intake air inlet passage and an arrangement direction of connection parts of the plurality of independent intake air passages in the intake air distribution portion are along with each other, and in the arrangement direction, a connection part between the intake air distribution portion and the intake air inlet passage is arranged to be most apart from the one end portion of the intake air inlet passage.

Since in the air intake apparatus of a multi-cylinder engine adopting the above configuration, the connection part between the intake air distribution portion and the intake air inlet passage is arranged most apart from the throttle valve in the extension direction of the intake air inlet passage, a maximum flow path length from the connection part, in the intake air inlet passage, of the secondary gas inlet passage to the intake air distribution portion can be ensured. Accordingly, the intake apparatus of a multi-cylinder engine according to the above aspect enables further higher mixing performance of fresh air and a secondary gas to be ensured.

Also in the air intake apparatus of a multi-cylinder engine according to the above aspect, in the intake air distribution portion, the reflux passage can be also formed and arranged at a side opposite to the connection part between the intake air distribution portion and the intake air inlet passage in the arrangement direction.

Since in the air intake apparatus of a multi-cylinder engine adopting the above configuration, in the intake air distribution portion, the reflux passage is formed and arranged at a side opposite to the connection part between the intake air distribution portion and the intake air inlet passage in the arrangement direction of the connection parts of the plurality of independent intake air passages, the intake air inlet passage, the intake air distribution portion, and the reflux passage can form a long circular flow path, which is further desirable for ensuring further higher mixing performance between fresh air and a secondary gas.

As described in the foregoing, the air intake apparatus of a multi-cylinder engine according to each of the above aspects enables suppression of malfunction of a throttle valve even when an outside air temperature is low, as well as ensuring high mixing performance of fresh air and a secondary gas.

This application is based on Japanese Patent application No. 2017-214407 filed in Japan Patent Office on Nov. 7, 2017, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An air intake apparatus of a multi-cylinder engine comprising:
   an intake air inlet passage with one end portion attached to a throttle valve;
   an intake air distribution portion which is a container connected to the other end of the intake air inlet passage and having a space therein for intake air distribution to each cylinder;
   a plurality of independent intake air passages each having one end connected to the intake air distribution portion and the other end connected to each intake port of the engine; and
   a secondary gas inlet passage which is a passage connected at a part spaced apart, in the intake air inlet passage, from the throttle valve by a predetermined interval for introducing a secondary gas to the intake air inlet passage,
   wherein the intake air distribution portion has a reflux passage which is a passage that connects the space and a part between the one end portion and the other end in the intake air inlet passage, the passage refluxing fresh air and the secondary gas introduced from the intake air inlet passage to the intake air inlet passage.

2. The air intake apparatus of a multi-cylinder engine according to claim 1, wherein a connection part of the reflux passage to the intake air inlet passage is downstream, in a flow direction of intake air, of a connection part of the secondary gas inlet passage to the intake air inlet passage.

3. The air intake apparatus of a multi-cylinder engine according to claim 1, wherein the intake air inlet passage has a rectification portion provided at a part more to the throttle valve side than to the connection part of the reflux passage such that the fresh air and the secondary gas flowing along an inner wall surface of the intake air inlet passage are spaced apart from the connection part of the reflux passage.

4. The air intake apparatus of a multi-cylinder engine according to claim 1, wherein the reflux passage is connected to the intake air inlet passage such that a tube axis of the reflux passage faces to a downstream side in the flow direction of intake air and is at an acute angle to a tube axis of the intake air inlet passage.

5. The air intake apparatus of a multi-cylinder engine according to claim 1, wherein an extension direction of the intake air inlet passage and an arrangement direction of connection parts of the plurality of independent intake air passages in the intake air distribution portion are along with each other, and in the arrangement direction, a connection part between the intake air distribution portion and the intake air inlet passage is arranged to be most apart from the one end portion of the intake air inlet passage.

6. The air intake apparatus of a multi-cylinder engine according to claim 5, wherein in the intake air distribution portion, the reflux passage is formed and arranged at a side opposite to the connection part between the intake air distribution portion and the intake air inlet passage in the arrangement direction.

* * * * *